ized Patent

United States Patent [19]
Keller

[11] Patent Number: 5,847,282
[45] Date of Patent: *Dec. 8, 1998

[54] PIEZORESISTIVE PRESSURE SENSOR OR PRESSURE DETECTOR ASSEMBLY

[75] Inventor: Hans W. Keller, Oerlingen, Switzerland

[73] Assignee: Keller AG Fur Druckmesstechnik, Winterthur, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 722,182

[22] PCT Filed: Jan. 18, 1996

[86] PCT No.: PCT/EP96/00202

§ 371 Date: Oct. 16, 1996

§ 102(e) Date: Oct. 16, 1996

[87] PCT Pub. No.: WO96/26423

PCT Pub. Date: Aug. 29, 1996

[30] Foreign Application Priority Data

Feb. 21, 1995 [DE] Germany ............ 295 02 825.4

[51] Int. Cl.⁶ ...................................................... G01L 7/00
[52] U.S. Cl. ............................................. 73/706; 73/727
[58] Field of Search ............................. 73/706, 727, 721

[56] References Cited

U.S. PATENT DOCUMENTS

| 5,115,676 | 5/1992 | Lee | 73/706 |
| 5,583,294 | 12/1996 | Karas | 73/706 |

FOREIGN PATENT DOCUMENTS

| 2630640 | 7/1976 | Germany . |
| 8500494.4 | 1/1985 | Germany . |
| 3703685A1 | 8/1988 | Germany . |
| 58-168930 A | 10/1983 | Japan . |

Primary Examiner—Joseph L. Felber
Attorney, Agent, or Firm—Haugen and Nikolai, P.A.

[57] ABSTRACT

An improved piezoresistive pressure sensor or an improved piezoresistive pressure pickup having a pressure measuring cell (13), a transmission diaphragm housing (7), which comprises a jacket housing section, a transmission diaphragm (17) and a backplate (21) and having a fluid pressure chamber (19) situated on the measuring diaphragm side is distinguished by the following features the jacket housing section of the transmission diaphragm housing (7) comprises a pressure chamber sleeve (33), the pressure chamber sleeve (33) and the backplate (21) consists of weldable steel, the transmission diaphragm housing (7) and thus the pressure chamber sleeve (33) are or can be inserted in an annular recess (31) in the connection housing (3) in a sealing manner, the connection housing (3) consists of a material which cannot be welded or cannot easily be welded, and the pressure chamber sleeve (33) and the backplate (21) are permanently welded in a sealing manner so as to seal off the pressure transmission medium provided in the measuring cell inner pressure chamber (15) thus formed.

6 Claims, 3 Drawing Sheets

PIEZORESISTIVE PRESSURE SENSOR OR PRESSURE DETECTOR ASSEMBLY

BACKGROUND OF THE INVENTION

The invention relates to a piezoresistive pressure sensor or pressure pickup.

Piezoresistive pressure cells are used in millions of numbers in a very wide range of applications.

Particularly when measuring the pressure of aggressive media, the measuring cells cannot be directly exposed to the aggressive medium. To this end, they are preferably installed in a pressure chamber which is filled with oil and accommodated in a housing. The pressure of the aggressive medium which is to be measured is transmitted via the diaphragm into the inner pressure chamber, holding the measuring cell, in the housing.

FIGS. 4 to 6 herein show a conventional piezoresistive pressure pickup in an assembly for measuring pressure in aggressive media. In this case it is an absolute pressure pickup, which is explained below.

The piezoresistive pressure pickup assembly shown in FIGS. 4 and 5 comprises a housing 1 and a connection housing 3, also referred to below as housing front part, on which an external screw thread 5 is arranged. The housing 1 further comprises a transmission diaphragm housing 7. The transmission diaphragm housing 7 has a hexagonal wrench face 9, comparable to a hexagonal screw or nut. The abovementioned transmission diaphragm housing 7 adjoins the connection housing 3 in the axial direction and is welded to the latter along the weld seam 10.

It can be seen from FIG. 4 that the transmission diaphragm housing 7 accommodates a piezoresistive pressure measuring cell 13 in an oil-filled pressure chamber 15, the chamber 15 being separated by means of a flexible transmission diaphragm 17 from a fluid pressure chamber 19 which is provided in the connection housing 3 and in which possibly the aggressive medium whose pressure is to be measured is present due to a pressure through-bore 20 made in the connection housing 3.

The oil-filled measuring cell pressure chamber 15 of the assembly is sealed at the opposite end to the transmission diaphragm 17 running transversely to the axial direction of the entire housing by a so-called glass bushing 21 which has a stepped shoulder and is also referred to below as the backplate. Guided through the glass bushing 21 are electrical contact conductors or contact pins 23, with which contact is made electrically on the inside directly or, for example, via a ribbon conductor 25 which may be a component such as a film or mounted on a printed circuit board, comprising a flexible conductor, by the pressure measuring cell 13 lying on the inside in the measuring cell compression chamber 15 in the transmission diaphragm housing 7. The use of a film 25 of this kind with flexible conductor tracks is depicted in the installed state in FIG. 4 and in an enlarged detail illustration in FIG. 5. FIG. 6 shows that the electrical connections can be made by means of gold or aluminum wires 25' from the measuring cell to the contact conductors or pins 23.

The electrical connections extending to the outwardly projecting contact pins 23, i.e. to the contact pins 23 projecting downward through the glass bushing 21, are not shown in the exemplary embodiment according to FIGS. 4 to 6 which is known from the prior art.

In order to reduce the total volume of oil in the inner pressure chamber, if required a displacement element 27, preferably made of ceramic and preferably having the density of the oil medium, may be fitted as well. As a result, temperature-dependent changes in volume of the oil medium are minimized.

In this known pressure pickup assembly, the measuring cell 13 is installed in the transmission diaphragm housing 7 (optionally resting on the glass bushing 21) in such a way that the glass bushing 21 with the measuring cell is placed on the transmission diaphragm housing 7, without welding, in the lower end opening region thereof in order then to place the entire arrangement in a so-called oil pot. The oil pot is first evacuated and then filled with oil. The oil can then enter the pressure chamber 15 holding the pressure measuring cell 13. When the inner chamber has been filled with oil, the glass bushing 21 is welded in the rear measuring cell housing section 7 and the inner pressure chamber 15 is thus sealed tightly.

In fact, in practice it has been found that the maximum level of reliability is achieved with pressure pickups of this kind if the inner pressure chamber 15 filled with a noncompressible liquid (oil in the exemplary embodiment shown) is permanently closed tightly or sealed by using a welding process.

The pressure pickups or pressure sensors explained, as disclosed by the prior art, have thoroughly proved themselves in practice. However, the comparatively quite high production costs for pickup heads of this kind, which are to be used primarily for measuring pressure in aggressive media, are disadvantageous.

The high production costs are due above all to the manufacture of the mechanical parts, i.e. of the housing front part and of the measuring cell housing section. Since all the parts must be welded to one another, all the parts must be made of stainless or weldable steel, thus further increasing the material and processing costs.

In principle it was indeed already known from DE 26 30 640 B2 to produce the so-called glass bushing from a base material made of corrosion-resistant soft iron, for example to reduce costs. However, the oil filling in pressure measuring cell units of this kind is not carried out with the seal of the pressure chamber holding the measuring cell being welded, as a result of which the current generation of pressure pickups, described with reference to FIGS. 4 et seq., is far superior to the earlier generation.

The object of the present invention is therefore to provide a piezoresistive pressure pickup or pressure sensor which can likewise be used in particular for measuring pressure in aggressive media and which in the process can be produced significantly more simply and/or more cost-effectively compared with the solutions which have been disclosed to date.

The object is achieved according to the assembly of the present invention in accordance with the features specified in the claims. Advantageous refinements of the invention are specified in the subclaims.

Quite surprisingly, the present invention makes it possible by means of the novel design to reduce the costs of the mechanical parts by up to 80% compared with conventional solutions. This gives an approximately 40% reduction in costs, based on the pressure pickup or pressure sensor as a whole.

In this case, the design of the assembly according to the invention provides a pressure pickup and pressure sensor which can also be used for measuring pressure in aggressive media without achieving poorer measurement results than with conventional solutions and without the overall structure being less able to withstand stresses than with the solution disclosed by the prior art.

The reduction in costs according to the invention results from the fact that the so-called housing front part can now be produced from more economical materials, such as for example brass, beryllium bronze or the like, i.e. of easily processable materials. In this case, the housing, including the connection housing holding the transmission diaphragm housing, can be formed from a cost-effective material of this kind.

Only in the interior is a sleeve inserted which is made of rustproof material and can be produced cost-effectively to bound the pressure chamber filled with oil. The sleeve is preferably produced by cutting an appropriate pipe to length. This means that there is no wastage of the expensive steel part. The processing costs for this must also be regarded as extremely low.

The use of this cost-effective weldable steel part makes it possible to seal the inner pressure chamber holding the pressure measuring cell permanently by welding it to the backplate, i.e. the glass bushing.

The further essential advantage according to the invention is that a large number of units can be soldered together in one fuel oil heater and can then be filled with oil, and that the pressure chamber filled with oil and holding the pressure measuring cell is then hermetically sealed by welding. In this way the weldable materials required for the welding operation are reduced to a minimum.

The transmission diaphragm accommodated in the housing inner chamber is now joined to the sleeve consisting of rustproof material, preferably in a hard soldering process.

During the soldering operation, i.e. when the soldering temperature is reached in the soldering furnace, it is possible for the solder to flow into all the gaps, i.e. for example between the diaphragm and the housing front part, between the diaphragm and the sleeve, as well as between the housing front part and the sleeve.

The design of the assembly according to the invention permits a wide variety of materials for the pickup housing surrounding the measuring cell and the measuring cell pressure chamber as well as for the transmission diaphragm situated therein. Materials which are difficult to solder, such as stainless steel, can be made more easy to solder by a surface coating of, for example, nickel.

Cost-effective materials such as brass or beryllium bronze are wholly sufficient for the pickup housing for many applications, such as for example when using air conditioning or refrigeration plants. For particularly critical applications, therefore, the corresponding annular chamber holding the sleeve consisting of stainless steel may be designed so as to extend beyond the height of the transmission diaphragm in the axial direction. In this preferred embodiment of the invention, a sleeve extension piece is accommodated in the axial extension of the sleeve, so as to hold the edge of the transmission diaphragm in between in a sandwich-like manner, so that there is no direct contact between the material of the transmission diaphragm and the material of the pickup housing. As a result, the possible risk of corrosion owing to contact between different materials is likewise excluded.

In this case too, the extension sleeve and the actual sleeve surrounding the pressure chamber and the edge of the transmission diaphragm inserted between the adjoining ends may preferably be welded together.

Furthermore, in a development of the invention, the use of one or more O-rings is also possible to achieve a further sealing effect.

In a preferred alternative embodiment, a housing which is connected by soldering housing parts consisting of nonweldable materials, may possibly be used. These housings, which are soldered together, likewise form an inner pressure chamber, for example holding a pressure measuring cell or, in the case of a reference pressure measuring device, the inner pressure chamber then being connected to the measuring cell via an appropriate connection line. The inner chamber filled with oil is then permanently sealed by means of a weldable tubular connection piece which is soldered into a corresponding bore in the housing and can be closed by means of a weldable stopper after having been filled with the oil.

Consequently, the invention not only offers the possibility of using cost-effective nonweldable materials during the production process, but above all also of joining these together firmly and securely, preferably in a soldering operation. As a result, considerable cost benefits are achieved not only in terms of materials but also in terms of production, since soldering processes can be carried out on several hundreds at a time in a soldering furnace, the corresponding inner pressure chambers then being filled with oil afterwards. Both the solution mentioned initially and that just mentioned provide economical means of finally sealing the pressure chamber filled with oil by welding. The expensive weldable materials which are required for this are in this case minimized and simplified to a very great extent, however, both with regard to the quantitative proportion which they take up of the overall housing and with regard to their structural, i.e. in particular shape-related, processing outlay, compared with conventional solutions.

The design principle according to the invention is, however, not limited to the application of a pressure pickup or pressure sensor for measuring absolute pressure. The design principle according to the invention can basically be used equally for a pressure sensor and pressure pickup for measuring a reference or differential pressure.

BRIEF DESCRIPTION OF THE INVENTION

The invention will be explained in greater detail below with reference to the figures, in which:

FIG. 1: shows a diagrammatic axial longitudinal sectional representation through a pressure pickup or pressure sensor according to the assembly of the invention for measuring an absolute pressure;

FIG. 2: shows an axial sectional representation which is comparable to FIG. 1 for the case of a pressure pickup or pressure sensor according to the assembly of the invention for measuring a differential pressure;

FIG. 3: shows an enlarged detailed representation in axial section of a measurement cell resting on a glass bushing;

FIG. 4: shows a pressure pickup, partially in axial section, disclosed by the prior art;

FIG. 5: shows an enlarged detailed representation for illustrating the connection of the pressure measuring cell to the contacting pins in accordance with the prior art according FIG. 4; and FIG. 6: shows an arrangement of the measuring cell on the glass bushing according to the prior art which differs from FIG. 5.

DETAILED DESCRIPTION OF THE DRAWINGS

Figure 1:
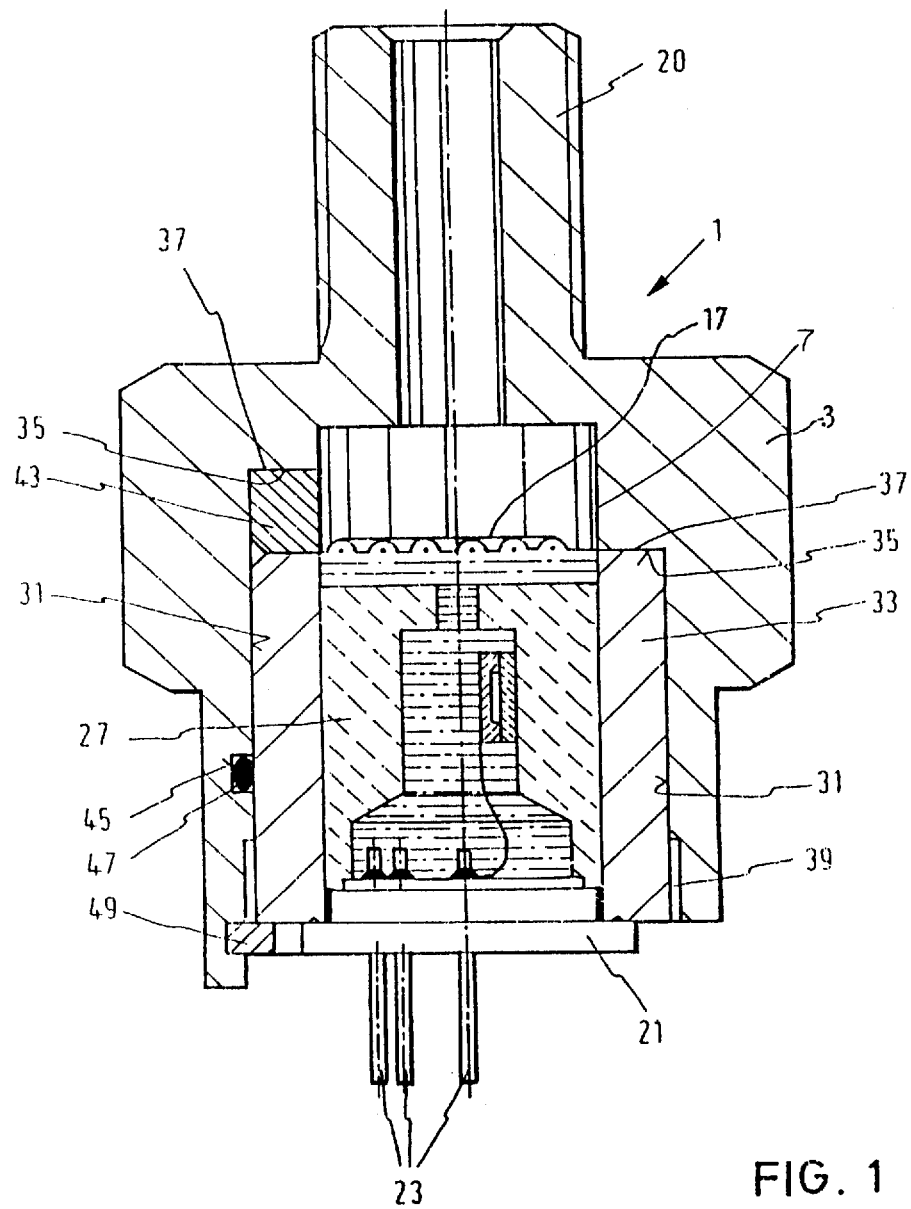

The invention will be explained below with reference to FIGS. 1 to 3, identical reference numerals as in the pressure pickups disclosed by the prior art in accordance with FIGS. 4 to 5 relating to identical parts.

Figure 4:
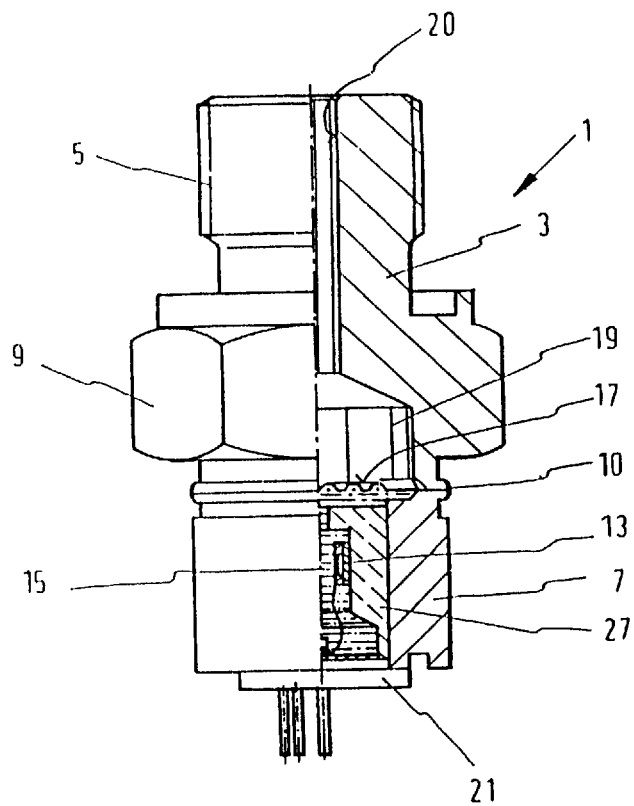
Figure 5:
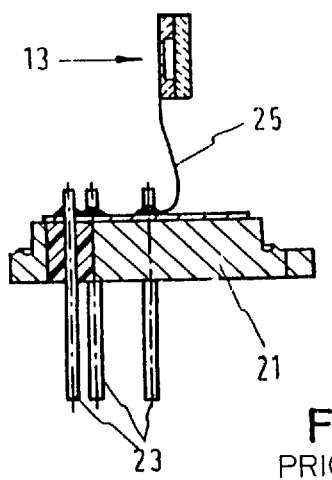
Figure 6:
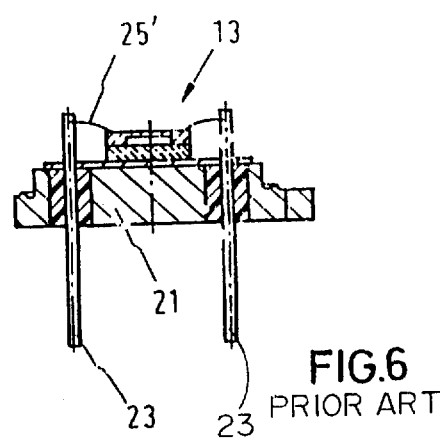

In the first example of a preferred embodiment of a pressure pickup or pressure sensor according to the invention in accordance with FIG. 1, the pickup or sensor comprises, in contrast to the known pressure pickups in accordance with FIGS. 4 to 6, a housing 1 with a connection housing 3, which engages over the transmission diaphragm housing 7. In this case, the connection housing consists of a cost-effective, nonweldable material, such as brass, beryllium bronze and the like, i.e. materials which are easily processable. The transmission diaphragm can consist of any suitable materials, in particular weldable steel material, in order to increase the corrosion resistance.

In the embodiment according to FIG. 1 shown, in the region of the transmission diaphragm housing 7, an internally downwardly open annular recess 31 is made in the housing 1, into which housing 1 a pressure chamber sleeve 33 made of rustproof material is inserted. This sleeve can be produced very cost-effectively and cut to length with the tube having the corresponding dimensions.

FIG. 1 in this case comprises two slightly modified exemplary embodiments, one exemplary embodiment being depicted to the right of the central axis. The embodiment variant to the right of the central axis will be described first below.

The transmission diaphragm 17 is placed on the stepped shoulder 35 of the housing 1 adjoining the axial length of the annular recess 31 and thus of the pressure chamber sleeve 33 inserted therein. The housing 1 in the region of the stepped shoulder 35, the measuring diaphragm 15 and the pressure chamber sleeve 33 are connected to one another in a hard soldering process. The solder which is required for this purpose is placed as a thin disk 37 on the circumferential edge of the transmission diaphragm 17 and the stepped shoulder 35 of the housing 1, during the production of the pressure pickup. The entire arrangement is then placed in a soldering furnace. As soon as the soldering temperature has been reached, the solder flows into all the gaps, i.e. between the transmission diaphragm 17 and the adjoining material section of the housing 1, i.e. the wall of the stepped shoulder 35, between the transmission diaphragm 17 and the pressure chamber sleeve 33, as well as between the cylindrical inner wall of the housing 1 in the region of the incorporated annular recess 31 and the adjoining outer wall of the pressure chamber sleeve 33 inserted therein.

In order that the glass bushing 21 is not damaged by possible thermal stresses after installation, the pressure chamber sleeve 33 is preferably produced and used with a sufficient wall thickness, if desired an annular gap 39 provided to a sufficient axial depth additionally being made internally in the measuring cell housing section 5 at the lower end face of the housing 1, so that there is a clearance over a sufficient axial length with respect to a surrounding outer cylindrical surface section of the pressure chamber sleeve 33.

Like the housing 1, the transmission diaphragm 17 may also be made of a wide variety of different materials. Materials which are difficult to solder, such as stainless steel, may be made more easy to solder by a surface coating, such as nickel.

In the axial sectional representation of FIG. 1, a further modification is shown which comprises a corrosion resistance which has been improved further.

In the modification in FIG. 1 on the left-hand side of the central axis, the annular recess 31 is designed so as to extend beyond the height of the transmission diaphragm 17. An extension sleeve 43, which is likewise made of rustproof material, preferably of the same material as the pressure chamber sleeve 33 and/or the transmission diaphragm 17, is also provided there as an extension of the pressure chamber sleeve 33, so as to hold the circumferential edge of the transmission diaphragm 17 in a sandwich-like manner. The transmission diaphragm 17, the pressure chamber sleeve 33 and the extension sleeve 43 are welded to one another before being fitted in the housing 1. The unit which has been preprocessed and welded in this way can then be pushed into the extended annular recess 31 in the housing 1, from the bottom end face, and then soldered to the housing 1 as explained above. In this case, a corresponding disk 37 consisting of solder is placed on the end-face sleeve ring of the extension sleeve 43, adjacent to the stepped shoulder 35 on the inner wall of the housing 1, which is now in a higher position, before being soldered.

Even if different materials are used for the housing 1 and the extension sleeve 43, any corrosion which exists here as a result of the different materials cannot, or cannot in practice, affect the actual pressure measuring cell and above all the pressure measuring diaphragm.

As is drawn to the left of the axial axis in the exemplary embodiment according to FIG. 1, at least one O-ring 47 can furthermore also be provided as a sealing protection. This O-ring may be placed in an annular groove 45 made in the annular recess 31 in the material of the housing 1 from the inside, which O-ring then brings about an additional sealing action at a corresponding height on the circumferential outer surface with respect to the pressure chamber sleeve 33. The unit comprising the pressure chamber sleeve 33, the extension sleeve 43 and the diaphragm 17 and formed by welding these components to one another may in this case possibly be inserted into the cylindrical recess only using the O-ring 47, the unit then being held in position for example by a retaining ring 49 or by another suitable mechanical means.

As a modified alternative, however, the pressure chamber sleeve 33 and the extension sleeve 43 may likewise be soldered to one another, rather than welded, at their end-face contact area which face one another, so as to hold the edge of the transmission diaphragm 17 at least partly in a sandwich-like manner. The soldering is in this case preferably carried out in the installed state, in order simultaneously to effect soldering to the inner wall of the outer or connection housing 3 as well.

Figure 2:
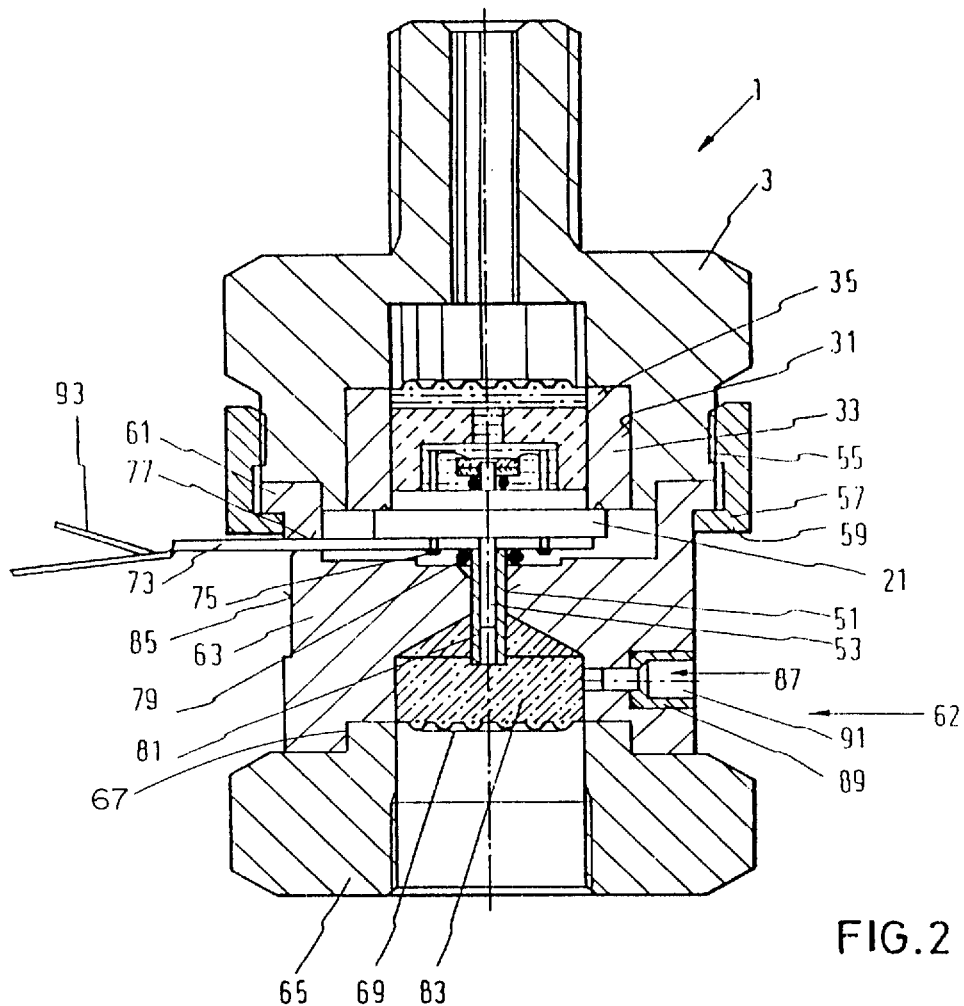
Figure 3:
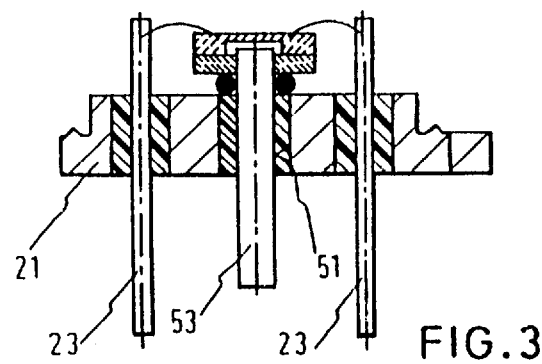

A further example of an alternate preferred embodiment of the assembly of the invention of a pressure pickup or pressure sensor, by means of which differential or reference pressures can also be measured, is shown with reference to FIGS. 2 and 3.

In this example of an alternate embodiment too, a pressure chamber sleeve 33 is correspondingly installed in a corresponding annular recess 31 in the housing 1 and is soldered to the edge of the transmission diaphragm to the stepped shoulder 35 of the housing 1. Here too, as a modification of the representation depicted, an extension sleeve 43 may further be provided to improve the protection against corrosion if an annular recess 31 extending beyond the height of the transmission diaphragm is made in the housing inner chamber 7 in the housing 1.

In accordance with the representation depicted in FIGS. 2 and 3, the backplate 21, which is here preferably designed in the form of a glass bushing 21, has a perforated bushing 51, into which a small pipe 53 is tightly inserted, preferably adhesively bonded.

As a modification of the housing 1 depicted in FIG. 1, a further external screw thread 55, onto which a fixing ring 57 with an annular flange 59 provided on its lower end face and projecting radially inward can be screwed, is provided on the outer circumference of the housing, for example at the level of the pressure chamber 15 which holds the measuring cell and can be filled with oil.

As an axial extension of the small pipe 53, the annular flange 59 engages behind a corresponding differential pressure housing part 63 which is provided with a radially outwardly projecting annular flange 61 and can be fixedly connected to the connection housing 3 as an axial extension thereof by screwing the fixing ring tight.

If it is not an aggressive medium which is involved in the measurement of the differential pressure, the construction is such that the differential pressure housing part 63 is adjoined as an axial extension thereof by a housing lower part 65 which at its end adjoins the differential pressure housing part 63 via an end-face stepped shoulder 67.

In this example of a preferred embodiment, a further diaphragm 69 is incorporated at the level of the stepped shoulder, so that the edge of the diaphragm 69 in turn comes to rest in a sandwich-like manner between the relevant end sections of the differential pressure housing part 63 and of the housing lower part 65.

Both the differential pressure housing part 63, the housing lower part 65 and the measuring diaphragm 69 can in this case also be produced from easily processable and possibly cost-effective materials and be soldered to one another in a soldering process, in which case, when the soldering process is carried out in the soldering furnace, the solder again flows between the measuring diaphragm 69 and the differential pressure housing part 63 and the end-face housing lower part 65, effecting a complete seal there.

The differential pressure or reference pressure pickup shown in FIGS. 2 and 3 is assembled in such a way that, in contrast to the embodiment according to FIG. 1, the glass bushing wires 23 are of shorter configuration or are shortened, flexible conductor tracks 73 being soldered at soldering points 75, at the free ends of these wires which project downward through the glass bushing. The differential pressure housing part 63 has a cutout 77, through which the conductor tracks 73 are guided outward. The reference pressure housing 62, comprising the differential pressure housing part 63 and the housing lower part 65, is mounted on the underside of the housing 1, which is provided for measuring the primary pressure, as an axial end-face extension thereof. In this case, an O-ring 79 is inserted beforehand at that end of the differential pressure housing part 63 which faces the connection housing 3, in a flat depression which is formed there. The O-ring 79 surrounds the small tube 53 which leads into the measuring cell inner chamber, is required for measuring the reference pressure and is additionally surrounded by a coaxial tube 81 which projects axially beyond the small tube 53 in the axial direction in the embodiment shown. The coaxial tube 81 in this case lies in a corresponding axial bore in the differential pressure housing part 63, which provides a connection to the pressure chamber 83 which can be filled with oil and is bounded by the second transmission diaphragm.

The abovementioned sealing O-ring 79 seals off the pressure chamber 83 which can be filled with oil.

The abovementioned fixing ring 57 is used to fix the reference pressure housing 62 with respect to the primary housing 1, the fixing ring 57 being screwed increasingly further and more tightly onto the external screw thread 55.

So that the abovementioned flexible conductor tracks 73 which are required as an electrical connection to the measuring cell are not damaged during the mechanical fixing and screwing of the fixing ring 57, a surface or recess 85, into which the radially outwardly projecting flexible conductor tracks 73 can be bent away for their protection by means of tools when the fixing ring 57 is being screwed on, is milled away on the outer circumference of the differential pressure housing part 63.

The semifinished structure thus prepared is then placed in the oil pot which has already been mentioned and is evacuated, and oil is allowed into the reference pressure chamber 83, to which end the radial filling duct 87 is provided with the steel tube connection 89 inserted therein, which connection is likewise soldered to the material of the differential pressure housing part 63.

The steel tube connection 89 made from weldable material is likewise soldered simultaneously with the soldering of the diaphragm 69 or the soldering of the differential pressure housing part 63 to the housing lower part 65.

When the reference pressure chamber space 83 has been filled with oil (the oil flowing right into the interior of the measuring cell 13), the oil filling opening 87 is closed and sealed with a peg 91, i.e. a closure peg 91. Since the peg 91, comprising the steel tube insert 89, consists of weldable material, the two can be optimally welded to one another.

External conductor tracks 93 can then be soldered onto the externally exposed ends of the flexible conductor tracks 73 leading inward into the housing.

I claim:

1. Piezoresistive pressure responsive sensor or pickup assembly comprising the following features:
    (a) a pressure measuring cell;
    (b) a transmission diaphragm housing, a pressure transmission diaphragm with opposed side surfaces mounted within said transmission diaphragm housing, and with said transmission diaphragm housing retaining the pressure measuring cell and being filled with a pressure transmission medium, and further comprising a jacket housing section and a backplate;
    (c) a connection housing provided on one side of said pressure transmission diaphragm and having a fluid pressure chamber situated therein and being characterized by the following further features:
        (1) the jacket housing section of the transmission diaphragm housing includes a pressure chamber sleeve;
        (2) the pressure chamber sleeve and the backplate consisting of weldable steel;
        (3) the transmission diaphragm housing including the pressure chamber sleeve portion of the jacket housing is adapted to be inserted in an annular recess formed in the connection housing in a sealing manner;
        (4) the connection housing consisting of a workable material selected from the group consisting of brass and beryllium bronze, and wherein the pressure chamber sleeve and the backplate are permanently secured together in a sealing manner so as to seal off the pressure transmission medium filling the transmission diaphragm housing retaining the measuring cell so as to form an inner pressure chamber;
        (5) the pressure measuring diaphragm being placed on a stepped shoulder formed within the connection housing so as to define the axial length of the annular recess in which the pressure chamber sleeve is received; and
        (6) the pressure measuring diaphragm and the pressure chamber sleeve being joined to the annular recess portion of the connection housing through a soldered connection.

2. Piezoresistive pressure responsive sensor or pickup assembly comprising the following features:

(a) a pressure measuring cell;

(b) a transmission diaphragm housing, a pressure transmission diaphragm with opposed side surfaces mounted within said transmission diaphragm housing, and with said transmission diaphragm housing retaining the pressure measuring cell being filled with a pressure transmission medium consisting of oil, and further comprising a jacket housing section and a backplate;

(c) a connection housing provided on one side of said pressure transmission diaphragm and having a fluid pressure chamber situated on the pressure transmission diaphragm side of said transmission diaphragm housing and being characterized by the following further features:

(1) the jacket housing section of the transmission diaphragm housing includes a pressure chamber sleeve;

(2) the pressure chamber sleeve and the backplate consist of weldable steel;

(3) the transmission diaphragm housing including the pressure chamber sleeve being adapted to be sealingly inserted in an annular recess formed in the connection housing;

(4) the connection housing consisting of a workable material selected from the group consisting of brass and beryllium bronze, and wherein the pressure chamber sleeve and the backplate are permanently bonded together in a sealing manner so as to seal off the pressure transmission medium filling the transmission diaphragm housing retaining the measuring cell so as to form an inner pressure chamber;

(5) the pressure chamber sleeve being provided with an extension sleeve and wherein said transmission diaphragm is mounted adjacent said extension sleeve so as to be positioned adjacent the inner axial end of the said annular recess; and (6) the pressure measuring diaphragm, the pressure chamber sleeve, and the extension sleeve being coupled to the inner surface of the annular recess of the connection housing through joints formed of solder.

3. Piezoresistive pressure responsive sensor or pickup assembly according to claim 1, characterized in that the said extension sleeve consists of a preformed tubular material.

4. Piezoresistive pressure responsive sensor or pickup assembly according to claims 1 or 2, characterized in that the said connection housing is filled with said pressure transmission medium and retains a pressure measuring cell, and wherein said transmission diaphragm housing retaining said pressure measuring diaphragm is arranged to be sealed by means of soldering, and further in that said filling duct means in communication with the inside of the transmission diaphragm housing is provided, and wherein said filling duct means is received within said transmission diaphragm housing along a soldered joint, the filling duct consisting of a weldable material and closable by means of a closure peg consisting of a weldable material.

5. Piezoresistive pressure responsive or pickup assembly according to claim 4, characterized in that said connection housing provided with said filling duct means is a reference or differential pressure housing positioned as an axial extension to the connection housing and being fixedly connected to the latter by means of a fixing device means.

6. Piezoresistive pressure responsive sensor or pickup assembly according to claim 5, characterized in that the inside of the housing retaining said pressure measuring cell is connected by a small tube penetrating said backplate to communicate with said pressure chamber formed in said reference or differential pressure housing.

* * * * *